United States Patent [19]
Kaya et al.

[11] Patent Number: 5,650,204
[45] Date of Patent: Jul. 22, 1997

[54] POLYESTER BOTTLE AND METHOD OF REMOVING ADSORBATES ON THE BOTTLE

[75] Inventors: Hidenori Kaya; Hiroji Niimi; Susumu Hatabu; Kunio Tomita, all of Yamaguchi, Japan

[73] Assignee: Mitsui Petrochemical Industries, Ltd., Tokyo, Japan

[21] Appl. No.: 305,324

[22] Filed: Sep. 6, 1994

[30] Foreign Application Priority Data

| Sep. 16, 1993 | [JP] | Japan | 5-230529 |
| Sep. 16, 1993 | [JP] | Japan | 5-230530 |
| Sep. 16, 1993 | [JP] | Japan | 5-230586 |

[51] Int. Cl.$^6$ ............ B65D 1/00; C08L 67/02
[52] U.S. Cl. ............ 428/35.7; 428/36.92; 428/910; 525/444; 525/448; 220/DIG. 11
[58] Field of Search .......... 428/33.7, 36.9, 428/36.92, 480, 910; 220/DIG. 11, DIG. 12, DIG. 14; 525/444, 448

[56] References Cited

U.S. PATENT DOCUMENTS

| 4,358,491 | 11/1982 | Ota et al. | 428/35.7 |
| 4,687,689 | 8/1987 | Yazaki et al. | 428/35.7 |
| 4,996,269 | 2/1991 | Richeson et al. | 525/444 |
| 5,261,545 | 11/1993 | Ota et al. | 428/35.7 |
| 5,352,401 | 10/1994 | Dalgewicz, III et al. | 525/444 |
| 5,407,752 | 4/1995 | Fukuzumi et al. | 525/444 |

FOREIGN PATENT DOCUMENTS

| 0481750 | 4/1992 | European Pat. Off. |
| 2030512 | 1/1990 | Japan |
| 2209219 | 8/1990 | Japan |
| 2052367 | 1/1981 | United Kingdom |
| 2085798 | 5/1982 | United Kingdom |

*Primary Examiner*—Rena Dye
*Attorney, Agent, or Firm*—Birch, Stewart, Kolasch & Birch, LLP

[57] ABSTRACT

The refillable polyester bottle of the invention has a mean crystallinity of 32 to 70% at the bottle body, a methanol adsorption of 1,500 ppm or less at the same portion and a paraxylene adsorption of 300 ppm or less at the same portion. Therefore, the bottle is excellent in non-adsorptivity and heat resistance. According to the method of removing adsorbates on a polyester bottle of the invention, the adsorbates can be rapidly desorbed by holding the bottle in air of 40° to 150° C. or bringing the bottle into contact with water or water vapor heated at 40° to 150° C.

4 Claims, 2 Drawing Sheets

5,650,204

POLYESTER BOTTLE AND METHOD OF REMOVING ADSORBATES ON THE BOTTLE

FIELD OF THE INVENTION

The present invention relates to a polyester bottle and a method of removing adsorbates on the polyester bottle. More particularly, the invention relates to a refillable polyester bottle having excellent non-adsorptivity and high heat resistance and also relates to a method of rapidly desorbing adsorbates on the polyester bottle.

BACKGROUND OF THE INVENTION

Various plastics, e.g., polyethylene terephthalate, have been conventionally used as materials for bottles of juices, natural water, tea and other drinks. The plastic bottles are usually disposable, but they have been recently required to be recovered and recycled after use from the viewpoints of saving energy and saving natural resources.

For recycling the plastic bottles, the bottles are washed and sterilized to remove organic or inorganic substances attached thereto and adsorbates such as substances having a taste or a scent adsorbed thereon, and then filled with contents. Even if the attached substances are completely removed by the washing, however, it is difficult to completely remove the adsorbates from the bottles. Therefore, after filling of the contents, the adsorbates are transferred to the contents thereby, to cause deterioration of the taste or the scent of the contents.

In order to recycle the bottles, accordingly, it is necessary that the bottles have small adsorption of the substances having a taste or a scent, i.e., excellent non-adsorptivity, and have high heat resistance capable of withstanding filling of high-temperature liquids which have been subjected to heat sterilization after washing. Further, also necessary is that the attached substances or the adsorbates are completely removed from the bottles.

The present inventors have earnestly studied to solve such problems associated with the prior art technique as mentioned above, and as a result, they have found that a bottle made of a specific polyester and having a high mean crystallinity at the bottle body is excellent in non-adsorptivity and heat resistance. They have also found that if the bottle having a high mean crystallinity at the bottle body is held in air or brought into contact with water or water vapor of a specific temperature, the adsorbates on the bottle can be rapidly desorbed. Based on these findings, the present invention has been accomplished.

SUMMARY OF THE INVENTION

Accordingly, an object of the present invention is to provide a refillable polyester bottle which is excellent in non-adsorptivity and heat resistance, and a method of removing adsorbates on the polyester bottle for the purpose of recycling the bottle.

The refillable polyester bottle of the invention is a stretched bottle formed from a polyester, and has a mean crystallinity of 32 to 70% at the bottle body.

The method of removing adsorbates on a polyester bottle of the invention comprises holding the above-mentioned bottle in air heated at 40° to 150° C. or bringing the bottle into contact with water or water vapor heated at 40° to 150° C. to desorb adsorbates on the bottle.

DETAILED DESCRIPTION OF THE INVENTION

Figure 1:
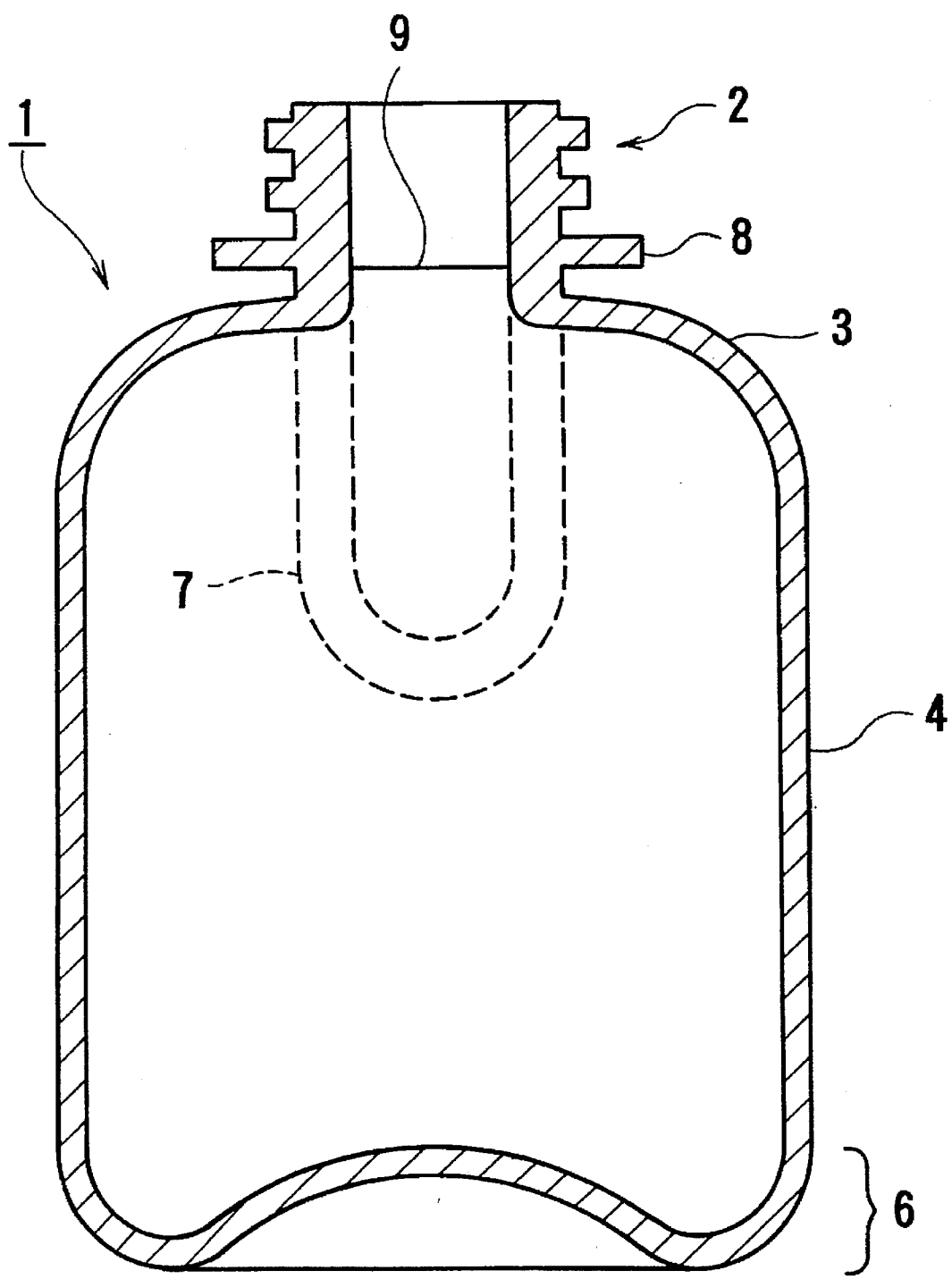
FIG. 1 shows a schematic sectional view of a bottle to explain the stretch index.

The refillable polyester bottle according to the invention and the method of removing adsorbates on the polyester bottle will be described in detail hereinafter.

The polyester to be used for the polyester bottle of the invention is one polyester selected from the group consisting of (i) polyethylene naphthalate, (ii) copolymerized polyesters (A) to (G), (iii) polyethylene terephthalate and (iv) a polyester resin composition comprising the polyethylene terephthalate and at least one of the copolymerized polyesters (A) to (G), all described below.

(i) Polyethylene naphthalate

The polyethylene naphthalate used in the invention desirably contains 60% by mol or more, preferably 80% by mol or more, most preferably 90% by mol or more of ethylene-2,6-naphthalate units derived from 2,6-naphthalenedicarboxylic acid and ethylene glycol, but it may further contain less than 40% by mol of other constituent units than the ethylene-2,6-naphthalate.

Examples of the constituent units other than the ethylene-2,6-naphthalate include those derived from:

aromatic dicarboxylic acids such as terephthalic acid, isophthalic acid, 2,7-naphthalenedicarboxylic acid, 2,5-naphthalenedicarboxylic acid, diphenyl-4,4'-dicarboxylic acid, 4,4'-diphenyletherdicarboxylic acid, 4,4'-diphenylsulfonedicarboxylic acid, 4,4'-diphenoxyethanedicarboxylic acid and dibromoterephthalic acid, aliphatic dicarboxylic acids such as adipic acid, azelaic acid, sebacic acid and decanedicarboxylic acid, alicyclic dicarboxylic acids such as 1,4-cyclohexanedicarboxylic acid, cyclopropanedicarboxylic acid and hexahydroterephthalic acid, or hydroxycarboxylic acids such as glycolic acid, p-hydroxybenzoic acid and p-hydroxyethoxybenzoic acid; and propylene glycol, trimethylene glycol, diethylene glycol, tetramethylene glycol, pentamethylene glycol, hexamethylene glycol, decamethylene glycol, neopentylene glycol, p-xylene glycol, 1,4-cyclohexanedimethanol, bisphenol A, p,p-diphenoxysulfone, 1,4-bis(β-hydroxyethoxy)benzene, 2,2-bis(p-β-hydroxyethoxyphenol)propane, polyalkylene glycol, p-phenylenebis(dimethylsiloxane), glycerol or others.

The polyethylene naphthalate used in the invention may further contain a small amount, for example, 2% by mol or less of constituent units derived from polyfunctional compounds such as trimesic acid, trimethylolethane, trimethylolpropane, trimethylolmethane and pentaerythritol.

The polyethylene naphthalate used in the invention may furthermore contain a small amount, for example, 2% by mol or less of constituent units derived from monofunctional compounds such as benzoylbenzoic acid, diphenylsulfonemonocarboxylic acid, stearic acid, methoxypolyethylene glycol and phenoxypolyethylene glycol.

Such polyethylene naphthalate is substantially in a linear structure, which can be confirmed by the fact that the polyethylene naphthalate is dissolved in o-chlorophenol.

The intrinsic viscosity [η] of polyethylene naphthalate, as measured in o-chlorophenol at 25° C., is desired to be in a range of from 0.2 to 1.1 dl/g, preferably 0.3 to 0.9 dl/g, more preferably 0.4 to 0.8 dl/g.

The intrinsic viscosity [η] of the polyethylene naphthalate is here determined in the following manner. That is, polyethylene naphthalate is dissolved in o-chlorophenol at a concentration of 1 g/100 ml, and the solution viscosity is measured at 25° C. by using a Ubbellohde capillary viscometer. Then, to the solution is gradually added o-chlorophenol to measure the solution viscosity of the diluted solution. The obtained data are used for extrapolation at 0% concentration, thereby to determine the intrinsic viscosity [η].

The heat-up crystallizing temperature (Tc) of polyethylene naphthalate, as measured when the temperature is raised by a differential scanning calorimeter (DSC) at a rate of 10° C./min, is usually 150° C. or higher, preferably 160° to 230° C., more preferably 170° to 220° C.

The heat-up crystallizing temperature (Tc) of polyethylene naphthalate is here determined in the following manner. That is, a thin piece about 10 mg of a polyethylene naphthalate taken from the center part of polyethylene naphthalate chip dried for about 5 hours or longer at about 140° C. under the pressure of about 5 mmHg is encapsulated in an aluminum pan for liquid in the atmosphere of nitrogen, and presented for measurement using a differential scanning calorimeter model DSC-2 produced by Perkin Elmer Co. By rapidly raising the temperature from room temperature, the test sample is melted at 290° C., and kept for 10 minutes. The, it is rapidly cooled down to room temperature. The peak temperature of exotherm detected when the temperature is raised again at a rate of 10° C./min thereafter is taken as the heat-up crystallization temperature (Tc).

(ii) Copolymerized polyesters (A) to (G)
Copolymerized polyester (A)

The copolymerized polyester (A) used in the invention comprises dicarboxylic acid constituent units comprising terephthalic acid component units and isophthalic acid component units, and dihydroxy compound constituent units comprising ethylene glycol component units.

As the dicarboxylic acid constituent units for forming the copolymerized polyester (A), the terephthalic acid component units are present in amounts of 80 to 100% by mol, preferably 80 to 99.5% by mol, more preferably 85 to 99.5% by mol, most preferably 85 to 97% by mol; and the isophthalic acid component units are present in amounts of 0 to 20% by mol, preferably 0.5 to 20% by mol, more preferably 0.5 to 15% by mol, most preferably 3 to 15% by mol.

The copolymerized polyester (A) may further contain, as the dicarboxylic acid constituent units, other dicarboxylic acid component units than the terephthalic acid component units and the isophthalic acid component units in such amounts that the characteristics of the resulting copolymerized polyester (A) are not marred, for example, 1% by mol or less.

Examples of such dicarboxylic acid component units include component units derived from phthalic acid and 2-methylterephthalic acid.

The copolymerized polyester (A) may further contain, as the dihydroxy compound constituent units, other dihydroxy compound component units than the ethylene glycol component units in such amounts that the characteristics of the resulting copolymerized polyester (A) are not marred, for example, 1% by mol or less.

Examples of such dihydroxy compound component units include component units derived from dihydroxy compounds of 3 to 15 carbon atoms such as 1,3-propanediol, 1,4-butanediol, neopentyl glycol, cyclohexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

Copolymerized polyester (B)

The copolymerized polyester (B) used in the invention comprises dicarboxylic acid constituent units comprising isophthalic acid component units and terephthalic acid component units, dihydroxy compound constituent units comprising dihydroxyethoxyresorcinol component units and ethylene glycol component units, and polyfunctional hydroxy compound constituent units having at least three hydroxy groups.

As the dicarboxylic acid constituent units for forming the copolymerized polyester (B), the isophthalic acid component units are present in amounts of 20 to 100% by mol, preferably 50 to 98% by mol; and the terephthalic acid component units are present in amounts of 0 to 80% by mol, preferably 0.5 to 50% by mol.

As the dihydroxy compound constituent units, the dihydroxyethoxyresorcinol component units are present in amounts of 5 to 90% by mol, preferably 10 to 85% by mol; and the ethylene glycol component units are present in amounts of 10 to 95% by mol, preferably 15 to 90% by mol.

As the copolymerized polyester (B), polyfunctional hydroxy compound constituent units having at least three hydroxy groups are present. The polyfunctional compound constituent units are present in amounts of 0.05 to 1.0 part by mol, preferably 0.1 to 0.5 part by mol, based on 100 parts by mol of the dicarboxylic acid constituent units.

Such polyfunctional hydroxy compound constituent units are derived from compounds such as trimethylolmethane, trimethylolethane and trimethylolpropane. Of these, preferred are those derived from trimethylolpropane.

The copolymerized polyester (B) may further contain, as the dicarboxylic acid constituent units, other dicarboxylic acid component units than the terephthalic acid component units and the isophthalic acid component units in such amounts that the characteristics of the resulting copolymerized polyester (B) are not marred, for example, 1% by mol or less.

Examples of such dicarboxylic acid component units include component units derived from phthalic acid, 2-methylterephthalic acid and 2,6-naphthalenedicarboxylic acid.

The copolymerized polyester (B) may further contain, as the dihydroxy compound constituent units, other dihydroxy compound component units than the dihydroxyethoxyresorcinol component units and the ethylene glycol component units in such amounts that the characteristics of the resulting copolymerized polyester (B) are not marred, for example, 1% by mol or less.

Examples of such dihydroxy compound component units include component units derived from the aforesaid dihydroxy compounds of 3 to 15 carbon atoms.

Copolymerized polyester (C)

The copolymerized polyester (C) used in the invention comprises dicarboxylic acid constituent units comprising terephthalic acid component units and 2,6-naphthalenedicarboxylic acid component units, and dihydroxy compound constituent units comprising ethylene glycol component units.

As the dicarboxylic acid constituent units for forming the copolymerized polyester (C), the terephthalic acid component units are present in amounts of 80 to 100% by mol, preferably 80 to 99.5% by mol, more preferably 90 to 99.5% by mol; and the 2,6-naphthalenedicarboxylic acid component units are present in amounts of 0 to 20% by mol, preferably 0.5 to 20% by mol, more preferably 0.5 to 10% by mol.

The copolymerized polyester (C) may further contain, as the dicarboxylic acid constituent units, other dicarboxylic acid component units than the terephthalic acid component units and the 2,6-naphthalenedicarboxylic acid component units in such amounts that the characteristics of the resulting copolymerized polyester (C) are not marred, for example, 1% by mol or less.

Examples of such dicarboxylic acid component units include component units derived from isophthalic acid, phthalic acid and 2-methylterephthalic acid.

The copolymerized polyester (C) may further contain, as the dihydroxy compound constituent units, other dihydroxy compound component units than the ethylene glycol component units in such amounts that the characteristics of the resulting copolymerized polyester (C) are not marred, for example, 1% by mol or less.

Examples of such dihydroxy compound component units include component units derived from the aforesaid dihydroxy compounds of 3 to 15 carbon atoms.

Comolymerized polyester (D)

The copolymerized polyester (D) used in the invention comprises dicarboxylic acid constituent units comprising terephthalic acid component units and adipic acid component units, and dihydroxy compound constituent units comprising ethylene glycol component units.

As the dicarboxylic acid constituent units for forming the copolymerized polyester (D), the terephthalic acid component units are present in amounts of 85 to 99.5% by mol, preferably 90 to 99.5% by mol; and the adipic acid component units are present in amounts of 0.5 to 15% by mol, preferably 0.5 to 10% by mol.

The copolymerized polyester (D) may further contain, as the dicarboxylic acid constituent units, other dicarboxylic acid component units than the terephthalic acid component units and the adipic acid component units in such amounts that the characteristics of the resulting copolymerized polyester (D) are not marred, for example, 1% by mol or less.

Examples of such dicarboxylic acid component units include component units derived from isophthalic acid, phthalic acid, 2-methylterephthalic acid and 2,6-naphthalenedicarboxylic acid.

The copolymerized polyester (D) may further contain, as the dihydroxy compound constituent units, other dihydroxy compound component units than the ethylene glycol component units in such amounts that the characteristics of the resulting copolymerized polyester (D) are not marred, for example, 1% by mol or less.

Examples of such dihydroxy compound component units include component units derived from the aforesaid dihydroxy compounds of 3 to 15 carbon atoms.

Copolymerized polyester

The copolymerized polyester (E) used in the invention comprises dicarboxylic acid constituent units comprising terephthalic acid component units, and dihydroxy compound constituent units comprising ethylene glycol component units and diethylene glycol component units.

As the dihydroxy compound constituent units for forming the copolymerized polyester (E), the ethylene glycol component units are present in amounts of 93 to 98% by mol, preferably 95 to 98% by mol; and the diethylene glycol component units are present in amounts of 2 to 7% by mol, preferably 2 to 5% by mol.

The copolymerized polyester (E) may further contain, as the dicarboxylic acid constituent units, other dicarboxylic acid component units than the terephthalic acid component units in such amounts that the characteristics of the resulting copolymerized polyester (E) are not marred, for example, 1% by mol or less.

Examples of such dicarboxylic acid component units include component units derived from isophthalic acid, phthalic acid, 2-methylterephthalic acid and 2,6-naphthalenedicarboxylic acid.

The copolymerized polyester (E) may further contain, as the dihydroxy compound constituent units, other dihydroxy compound component units than the ethylene glycol component units and the diethytene glycol component units in such amounts that the characteristics of the resulting copolymerized polyester (E) are not marred, for example, 1% by mol or less.

Examples of such dihydroxy compound component units include component units derived from the aforesaid dihydroxy compounds of 3 to 15 carbon atoms.

Copolymerized polyester (F)

The copolymerized polyester (F) used in the invention comprises dicarboxylic acid constituent units comprising terephthalic acid component units, and dihydroxy compound constituent units comprising ethylene glycol component units and neopentyl glycol component units.

As the dihydroxy compound constituent units for forming the copolymerized polyester (F), the ethylene glycol component units are present in amounts of 85 to 100% by mol, preferably 85 to 99.5% by mol, more preferably 90 to 99.5% by mo; and the neopentyl glycol component units are present in amounts of 0 to 15% by mol, preferably 0.5 to 15% by mol, more preferably 0.5 to 10% by mol.

The copolymerized polyester (F) may further contain, as the dicarboxylic acid constituent units, other dicarboxylic acid component units than the terephthalic acid component units in such amounts that the characteristics of the resulting copolymerized polyester (F) are not marred, for example, 1% by mol or less.

Examples of such dicarboxylic acid component units include component units derived from isophthalic acid, phthalic acid, 2-methylterephthalic acid and 2,6-naphthalenedicarboxylic acid.

The copolymerized polyester (F) may further contain, as the dihydroxy compound constituent units, other dihydroxy compound component units than the ethylene glycol component units and the neopentyl glycol component units in such amounts that the characteristics of the resulting copolymerized polyester (F) are not marred, for example, 1% by mol or less.

Examples of such dihydroxy compound component units include component units derived from dihydroxy compounds of 3 to 15 carbon atoms such as 1,3-propanediol, 1,4-butanediol, cyclohexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

Copolymerized polyester (G)

The copolymerized polyester (F) used in the invention comprises dicarboxylic acid constituent units comprising terephthalic acid component units, and dihydroxy compound constituent units comprising ethylene glycol component units and cyclohexanedimethanol component units.

As the dihydroxy compound constituent units for forming the copolymerized polyester (G), the ethylene glycol component units are present in amounts of 85 to 100% by mol, preferably 85 to 99.5% by mol. more preferably 90 to 99.5% by mol; and the cyclohexanedimethanol component units are present in amounts of 0 to 15% by mol, preferably 0.5 to 15% by mol, more preferably 0.5 to 10% by mol.

The copolymerized polyester (G) may further contain, as the dicarboxylic acid constituent units, other dicarboxylic acid component units than the terephthalic acid component units in such amounts that the characteristics of the resulting copolymerized polyester (G) are not marred, for example, 1% by mol or less.

Examples of such dicarboxylic acid component units include component units derived from isophthalic acid, phthalic acid, 2-methylterephthalic acid and 2,6-naphthalenedicarboxylic acid.

The copolymerized polyester (G) may further contain, as the dihydroxy compound constituent units, other dihydroxy compound component units than the ethylene glycol component units and the cyclohexanedimethanol component units in such amounts that the characteristics of the resulting copolymerized polyester (G) are not marred, for example, 1% by mol or less.

Examples of such dihydroxy compound component units include component units derived from dihydroxy compounds of 3 to 15 carbon atoms such as 1,3-propanediol, 1,4-butanediol, neopentyl glycol, cyclohexanediol, 1,3-bis (2hydroxyethoxy)benzene, 1,4-bis(2-hydroxyethoxy) benzene, 2,2-bis(4-β-hydroxyethoxyphenyl)propane and bis (4-β-hydroxyethoxyphenyl)sulfone.

There is no specific limitation on the molecular weight of the copolymerized polyesters (A) to (G), as far as the molecular weight is in such a range that various molded articles such as bottles can be produced from the polyesters. In general, however, the intrinsic viscosity [η] of the copolymerized polyester resins, as measured in an o-chlorophenol solvent, is in the range of 0.5 to 1.5 dl/g, preferably 0.6 to 1.2 dl/g.

(iii) Polyethylene terephthalate

The polyethylene terephthalate used in the invention is prepared from terephthalic acid and ethylene glycol as starting materials, but other dicarboxylic acids than the terephthalic acid and/or other dihydroxy compounds than ethylene glycol may be copolymerized in amounts of 20% by mol or less.

Examples of other dicarboxylic acids than the terephthalic acid which may be copolymerized include:

aromatic dicarboxylic acids, such as phthalic acid, isophthalic acid, naphthalenedicarboxylic acid, diphenyldicarboxylic acid and diphenoxyethanedicarboxylic acid;

aliphatic dicarboxylic acids, such as adipic acid, sebacic acid, azelaic acid and decanedicarboxylic acid; and alicyclic dicarboxylic acids such as cyclohexanedicarboxylic acid.

Examples of other dihydroxy compounds than ethylene glycol which may be copolymerized include:

aliphatic glycols, such as trimethylene glycol, propylene glycol, tetramethylene glycol, neopentyl glycol, hexamethylene glycol and dodecamethylene glycol;

alicyclic glycols such as cyclohexane dimethanol;

bisphenols; and aromatic diols, such as hydroquinone and 2,2-bis(4-β-hydroxyethoxyphenyl)propane.

Such a polyethylene terephthalate is substantially in a linear structure by forming ester linkages arranging only the ethylene terephthalate component units or both the ethylene terephthalate component units and the dioxyethylene terephthalate component units at random, which can be confirmed by the fact that the polyethylene terephthalate is dissolved in o-chlorophenol.

The polyethylene terephthalate has an intrinsic viscosity [η], as measured in o-chlorophenol at 25° C., of usually 0.6 to 1.5 dl/g, preferably 0.7 to 1.2 dl/g, a melting point of usually 210° to 265° C., preferably 220° to 260° C., and a glass transition temperature of usually 50° to 120° C., preferably 60° to 100° C.

(iv) Polyester resin composition

The polyester resin composition used in the invention is a composition comprising at least one of (ii) the copolymerized polyesters (A) to (G) and (iii) the polyethylene terephthalate.

Among those various polyester resin compositions, a desirable one is a polyester resin composition containing the polyethylene terephthalate in an amount of 85 to 99% by weight, preferably 85 to 95% by weight, and at least one of the copolymerized polyester (A) to (G) in an amount of 15 to 1% by weight, preferably 15 to 5% by weight. The polyester resin composition is desired to have an intrinsic viscosity [η] of 0.5 to 1.5 dl/g, preferably 0.6 to 1.2 dl/g.

Among the above-described polyesters and polyester resin composition, particularly preferably used in the invention are:

(i) the polyethylene naphthalate, (ii) the copolymerized polyester (A) comprising dicarboxylic acid constituent units essentially consisting of 80 to 100% by mol of the terephthalic acid component units and 0 to 20% by mol of the isophthalic acid component units, and dihydroxy compound constituent units essentially consisting of 80 to 100% by mol of the ethylene glycol component units and 20 to 0% by mol of other glycol component units than the ethylene glycol component units; and (iv) the polyester resin composition comprising 85 to 99% by weight of the polyethylene terephthalate and 15 to 1% by weight of the copolymerized polyester (B) which comprises the dicarboxylic acid constituent units essentially consisting 20 to 100% by mol of the isophthalic acid component units and 80 to 0% by mol of the terephthalic acid component units, the dihydroxy compound constituent units essentially consisting of 5 to 90% by mol of the dihydroxyethoxyresorcinol component units and 95 to 10% by mol of the ethylene glycol component units, and the polyfunctional hydroxy compound constituent units having at least three hydroxy groups which are contained in amounts of 0.05 to 1.0 part by mol based on 100 parts by mol of the dicarboxylic acid constituent units.

The polyethylene naphthalate (i), the copolymerized polyesters (A) to (G) (ii), the polyethylene terephthalate (iii) and the polyester resin composition (iv) used for producing the polyester bottle of the invention can be prepared by conventionally known methods. To each of these resins may be added various additives such as crosslinking agents, heat stabilizers, weathering stabilizers, antistatic agents, lubricants, parting agents, inorganic fillers, pigment dispersants, pigments and dyes, with the proviso that the objects of the invention are not marred.

The polyester bottle of the invention has to have a mean crystallinity, at the bottle body, of 32 to 70%, preferably 35 to 65%, more preferably 40 to 60%.

The polyester bottle of the invention is also desired to have a methanol adsorption, at the bottle body, of 1,500 ppm or less, preferably 1,300 ppm or less, based on a weight of the bottle body when measured by the method described later, and to have a paraxylene adsorption, at the bottle body, of 300 ppm or less, preferably 200 ppm or less, based on a weight of the bottle body when measured by the method described later. Further, the polyester bottle of the invention desirably has a methanol adsorption of 800 ppm or less and a paraxylene adsorption of 70 ppm or less, based on a weight of the bottle body when measured by the method described later after allowing the bottle adsorbed with methanol or paraxylene to keep at 80° C. for 4 hours.

As the solvents for the adsorptivity evaluation, a solvent having a high solubility parameter and a solvent having a low solubility parameter were employed. The solubility parameter of methanol is 14.5 cal$^{1/2}$cm$^{-3/2}$, and the solubility parameter of p-xylene is 8.8 cal$^{1/2}$cm$^{-3/2}$. The term "solubility parameter" used herein is defined by $(\Delta E^V/V)^{1/2}$ wherein $\Delta E^V$ is molar evaporation energy of the solvent, and V is molar volume of the solvent.

The polyester bottle desirably has a stretch index, as defined below, of 130 cm or more.

$$\text{Stretch Index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \text{ (cm}^{-1}\text{)}$$

The thickness at the bottle body is similar to the conventionally known bottles, which is usually 0.1 to 1.0 mm, preferably 0.2 to 0.8 mm.

Next, the stretch index, the mean crystallinity, the methanol adsorption and the paraxylene adsorption of the bottle used herein are explained.

[Stretch index]

The stretch index is defined as above.

The stretch index of the bottle of the invention is explained below with reference to FIG. 1. FIG. 1 is a schematic sectional view of a bottle to explain the stretch index.

As shown in FIG. 1, a bottle 1 comprises neck 2, upper shoulder 3, body 4 and bottom 6.

When such bottle 1 is produced, a preform 7 is used, which is expressed by a dot line in FIG. 1.

The internal volume of the bottle 1 (i.e., internal volume of a stretched bottle) is defined as the internal volume of the bottle 1 excluding the neck 2 portion, or in detail, it means the internal volume of the bottle under a support ring 8, and in more detail, the internal volume of the bottle under a virtual line 9.

The internal volume of the preform 7 (i.e., internal volume of an unstretched preform) means the internal volume of the preform 7 excluding the neck 2 portion, or in detail, it means the internal volume of the preform 7 under the support ring 8, and in more detail, the internal volume of the bottle under the virtual line 9.

The internal surface area of the bottle 1 (i.e., internal surface area of a stretched bottle) means the internal surface area of the bottle 1 excluding the neck 2 portion, or in detail, it means the internal surface area of the bottle 1 under the support ring 8, and in more detail, the internal surface area of the bottle under the virtual line 9.

The internal surface area of the stretched bottle (excluding the internal surface area of the neck) can be determined by micro-division method having the steps of dividing the bottle into micro-parts, detecting the internal surface shape by using three-dimensional measuring device, and integrating the areas of the micro-parts.

When the bottle is in a simple shape, the internal surface area of the bottle (excluding the surface area of the neck) can be obtained in an approximate value by assuming the bottle body to be cylindrical and both the upper and the lower parts of the bottle to be hemispherical.

The stretch index of such a bottle can be calculated by obtaining the internal volume of the stretched bottle (excluding the volume of the neck) and the internal volume of the unstretched preform (excluding the volume of the neck) together with the internal surface area of the stretched bottle (excluding the internal surface area of the neck). The internal volume of the bottle (excluding the volume of the neck) and the internal volume of the unstretched preform (excluding the volume of the neck) can be easily measured by pouring liquid such as water into them.

The units of the value f and the stretch index are cm$^{-1}$ and cm, respectively.

[Mean crystallinity]

The mean crystallinity of the bottle body is a mean value of the crystallinity measured on three test samples prepared in the following manner.

Test sample

The bottle body was cut into strips each having a size of 10 mm×10 mm, and they were laminated one upon another in such a manner that the thickness of the laminate was 1 mm, to prepare a test sample.

Instrument

X-ray diffractometer: RU-300 produced by Rigaku Denki K. K.

X-ray source: CuKα (point focus)

Voltage, current: 60 kV, 300 mA

Accessory: wide angle goniometer, revolving sample holder

Optical system: transmission method (2θ scan) collimeter (1 mmφ)

Detector: scintillation counter

Measurement of crystallinity

1. The angle between the diffracted beam and the transmitted beam is set constant at 2θ, and the diffraction intensity of the sample is measured in the case where 2θ is in the range of 5° to 35°.

2. From the diffraction intensity measured in the above procedure 1, a background diffraction intensity is subtracted. A curve of the diffraction intensity thus obtained is taken as a curve C.

3. A diffraction intensity curve given by the same resin as the measured sample but in the 100% amorphous state is taken as a curve A.

4. The crystallinity ($X_{cr}$) of the test sample is calculated by the following equation.

$$X_{Cr} = \frac{\text{Area of Curve } C}{(\text{Area of Curve } C) - (\text{Area of Curve } A)} \times 100 \, (\%)$$

Figure 2:
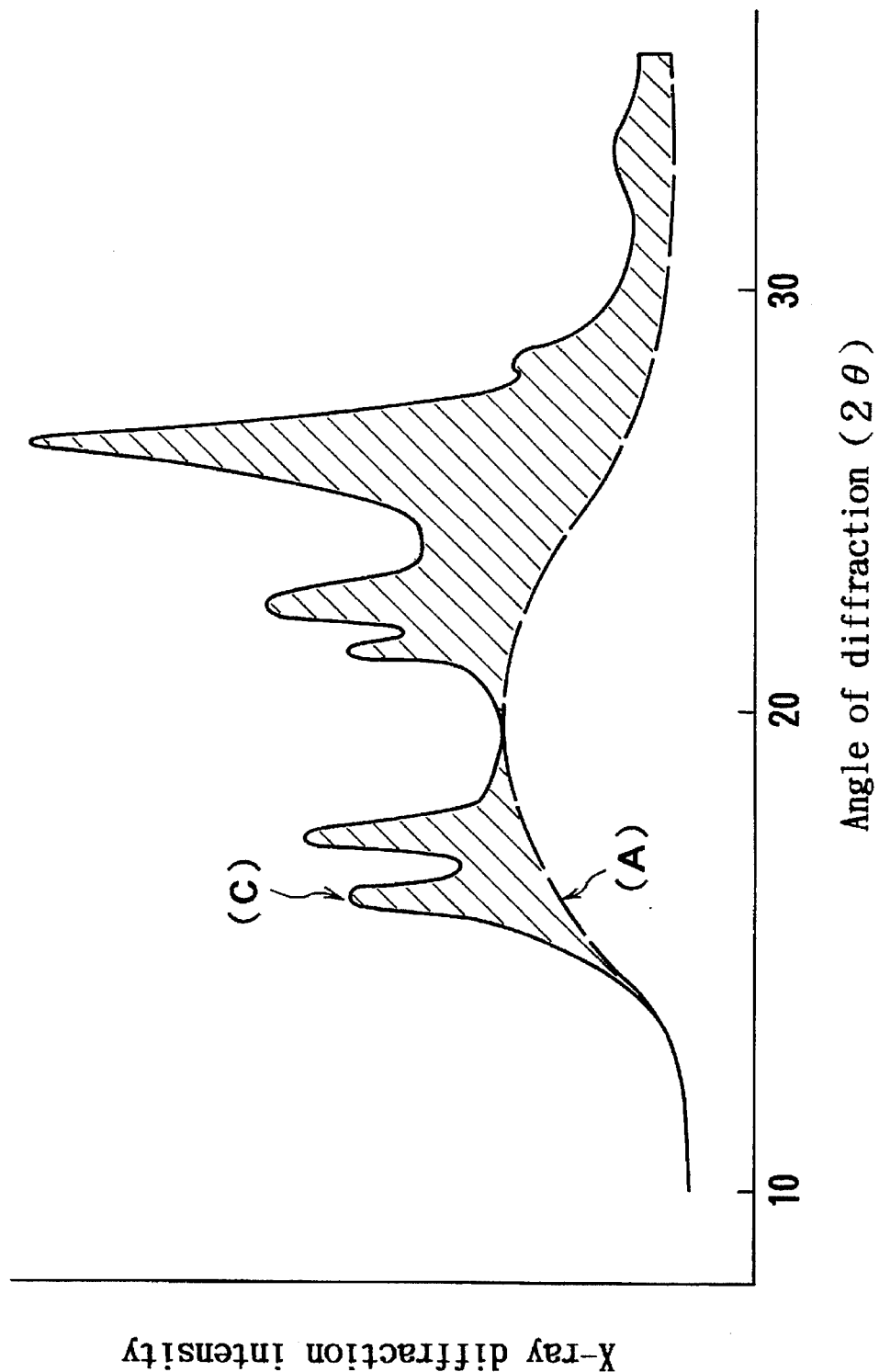
FIG. 2 shows X-ray diffraction intensity curves to illustrate a method for measuring crystallinity. In this figure, the curve (A) is a diffraction intensity curve of a 100% amorphous substance, and the curve (C) is a diffraction intensity curve of a bottle.

Examples of the X-ray diffraction intensity curve are shown in FIG. 2.

[Adsorption of methanol or paraxylene]

The measurement of adsorption of methanol or paraxylene is carried out by gas chromatography analysis with a head space method.

After a bottle containing 1.5 liters of methanol (or paraxylene) is allowed to stand for 7 days at 25° C. and 50% RH, methanol (or paraxylene) is drawn out of the bottle. Then, the bottle is washed with distilled water, and dry air is blown into the bottle to dry the interior of the bottle. Thus, a methanol (or paraxylene) adsorbed bottle is prepared.

Then, a test sample of 2 g is cut from the bottle body. The test sample is placed in a sample vial, and a substance which comes out from the sample for 30 minutes under the conditions of a head space temperature of 145° C. is analyzed and quantitatively determined by gas chromatography.

The process for producing the polyester bottle of the invention is described below. The polyester bottle of the invention comprises, as shown in FIG. 1, neck 2, upper shoulder 3, body 4 and bottom 6.

For producing such bottle, a preform is first formed from the above-mentioned polyester. The preform can be formed by conventionally known methods such as injection molding and extrusion molding. The heating temperature of the polyester for forming the preform is as follows. For example, when the polyester is the polyethylene naphthalate (i), the temperature is desirably in the range of 280° to 320° C.; when the polyester is any of the copolymerized polyesters (ii) (polyesters (A) to (G)), the temperature is desirably in the range of 280° to 320° C.; when the polyester is the polyethylene terephthalate (iii), the temperature is desirably in the range of 270° to 300° C.; and when the polyester is the polyester resin composition (iv), the temperature is desirably in the range of 270° to 300° C.

Then, the preform is heated to a temperature suitable for stretching, and is subjected to stretching and blowing in a mold to give a bottle. As for the heating temperature of the preform, when the polyester is the polyethylene naphthalate, it is desirably in the range of 120° to 180° C.; when the polyester is any of the copolymerized polyesters (A) to (G), it is desirably in the range of 95° to 120° C.; when the polyester is the polyethylene terephthalate, it is desirably in the range of 95° to 125° C.; and when the polyester is the polyester resin composition, it is desirably in the range of 95° to 120° C.

The temperature of a fluid used for the blowing is desired to be in the range of 10° to 400° C., preferably 20° to 300° C. Examples of the fluids to be blown include air, nitrogen, water vapor and water. Of these, air is preferred.

Thereafter, the bottle is subjected to heat setting at a mold temperature of 100° to 250° C., preferably 110° to 200° C., for 1 second or longer, preferably 3 seconds or longer, so as to allow the body of the bottle to have a mean crystallinity of 32 to 70%, preferably 35 to 65%, more preferably 40 to 60%.

Prior to taking the heat set bottle out of the mold, the bottle is desirably cooled. For cooling the bottle, an internal cooling method is preferably used. In this method, the bottle is cooled from the hollow portion of the bottle with a fluid having a temperature of −200° to 50° C., preferably −80° to 40° C. At this moment, the surface temperature of the bottle is desired to be 100° C. or lower, preferably 80° C. or lower. Examples of the fluids used herein include air, nitrogen and water. Of these, air is preferably used.

When the bottle having been heat set is cooled from the inside or the outside prior to taking the bottle out of the mold, the bottle can be inhibited from being distorted or shrunk.

Such a polyester bottle has a high crystallinity at the bottle body, and hence it is hardly adsorbed with substances having a taste or a scent, that is, it has good non-adsorptivity, and has a high heat resistance.

Next, the method of removing adsorbates on a polyester bottle according to the invention is described.

The polyester for forming the polyester bottle which is used in the method of removing adsorbates on a polyester bottle according to the invention is preferably one polyester selected from the group consisting of the polyethylene naphthalate (i), the copolymerized polyesters (A) to (G) (ii), the polyethylene terephthalate (iii), and the polyester resin composition (iv), all described before.

The bottle formed from the polyester has such a shape as shown in FIG. 1, and comprises neck 2, body 4 and bottom 6.

The mean crystallinity of the body 4 of the bottle used in this invention has to be in the range of 32 to 70%, preferably 35 to 65%, more preferably 40 to 60%.

The mean crystallinity of the neck 2 is desired to be in the range of 32 to 70%, preferably 35 to 65%, and the mean crystallinity of the bottom 6 is desired to be in the range of 0 to 50%, preferably 30 to 70%, more preferably 35 to 65%.

In this invention, the polyester bottle is held in air at 40° to 150° C., preferably 50° to 140° C., more preferably 70° to 130° C., for 10 to 500 minutes, preferably 30 to 300 minutes, more preferably 120 to 240 minutes, or brought into contact with water or water vapor heated at 40° to 150° C., preferably 50° to 140° C., more preferably 70° to 130° C., for 5 to 180 minutes, preferably 10 to 120 minutes, more preferably 15 to 60 minutes, so as to desorb adsorbates on the bottle.

When the polyester bottle is held in air at 40° to 150° C., the humidity is desired to be 50% RH or lower.

Water used in the invention is, for example, distilled water, a 0.1–10% aqueous solution of alkali such as an aqueous solution of sodium hydroxide, or a 0.1–10% aqueous solution of acid such as an aqueous solution of hydrochloric acid.

The contact between the bottle and water can be carried out by the use of running water or by immersing the bottle in water.

The contact between the bottle and water vapor can be carried out by holding the bottle under the conditions of a humidity of 80% RH or higher.

The polyester bottle used in the invention has a mean crystatlinity of 32 to 70% at the bottle body. By holding the bottle in air at a specific temperature or bringing the bottle into contact with water or water vapor of a specific temperature, the adsorbates such as substances having a taste or a scent adsorbed on the bottle can be rapidly desorbed.

Further, the polyester bottle having a mean crystallinity of 32 to 70% at the bottle body is free from distortion caused by heating, because it has high heat resistance.

In the method of removing adsorbates on the polyester bottle according to the invention, the polyester bottle is held in air at a specific temperature or brought into contact with water or water vapor of a specific temperature, and therefore the adsorbates adsorbed on the bottle can be easily removed.

According to the invention, moreover, the bottle can be advantageously recycled, and the recycled bottle from which the adsorbates have been removed in accordance with the invention never deteriorates the taste or the scent of the content filled in the bottle.

EXAMPLE

The present invention is further described below with reference to the following examples, but it should be construed that the invention is in no way limited to those examples.

In the invention, evaluation of the heat resistance and the non-adsorptivity of the bottle and measurement of the mean crystallinity of the bottle body were carried out in the following manner.

[Heat resistance]

The heat resistance of the bottle was evaluated by filling the bottle with hot water of 90° C. and classifying the distortion of the bottle into the following three groups. The bottle showing small distortion has high heat resistance.

Very good: Distortion of the bottle is not observed.

Good: The bottle is slightly distorted in part.

Poor: The bottle is greatly distorted and cannot be practically used.

[Non-adsorptivity (adsorption of methanol or paraxylene)]

After a bottle containing 1.5 liters of methanol (or paraxylene) was allowed to stand for 7 days at 25° C. and 50% RH, methanol (or paraxylene) was drawn out of the bottle. Then, the bottle was washed with distilled water (e.g., 20° C.), and dry air (e.g., 30° C.) was blown into the bottle to dry the interior of the bottle. Thus, a methanol (or paraxylene) adsorbed bottle was prepared and an adsorption of the adsorbate (i.e. methanol or paraxylene) of the resultant adsorbed bottle were measured.

The thus prepared bottle was subjected to a treatment for removing the adsorbate in the manner as described in each Examples and Comparative Examples and then an adsorption of the adsorbate of the resultant bottle were measured.

The measurement of the absorption of the adsorbate was carried out as follows. The body portion of the bottle was cut to give a test sample of 2 g. The test sample was placed in a 10 ml-sample vial, and methanol (or paraxylene) which came out from the sample for 30 minutes under the conditions of a head space temperature of 145° C. was analyzed and quantitatively determined by a headspace-gas chromatography.

[Mean crystallinity]

The mean crystallinity at the bottle body was measured by the same procedure as described above.

Comparative Example 4

Polyethylene terephthalate (J135 available from Mitsui PET Resin K.K.) was molded by an injection molding machine M-100A produced by Meiki Seisakusho K.K. to obtain a preform. The molding temperature at this time was 290° C.

Subsequently, the preform was heated by an infrared heater provided as an accessory on the molding machine so that the center of the preform body had a surface temperature of 90° to 100° C., and then subjected to stretching and blowing by the use of a blowing machine LB-01 produced by CORPOPLAST Co. to obtain a bottle (mean crystallinity at the bottle body: 33%).

In the above stretching and blowing, the mold was heated to 130° C., and the bottle was contacted with the mold for 5 seconds to heat set the bottle. Thereafter, the bottle was cooled to 100° C. or lower, and taken out of the mold.

The heat resistance of the resultant bottle was evaluated, and the result are shown in Table 1.

Further, the non-adsorptivity of the resultant bottle was evaluated in the same manner as described above, in which the methanol (or paraxylene) adsorbed bottle was subjected to the treatment of holding for 4 hours in an air oven having a humidity of 30% RH and temperatures indicated in Table 1. The adsorptions before and after the treatment of the bottle are also shown in Table 1.

Comparative Example 5

The procedures of Comparative Example 4 were repeated except that the mold was heated to 150° C. in the stretching and blowing, to obtain a bottle (mean crystallinity at the bottle body: 38%).

The heat resistance and the non-adsorptivity of the bottle were evaluated in the same manner as in Comparative Example 4. The results are shown in Table 1.

Comparative Example 6

The procedures of Comparative Example 4 were repeated except that the mold was heated to 200° C. in the stretching and blowing, to obtain a bottle (mean crystallinity at the bottle body: 42%).

The heat resistance and the non-adsorptivity of the bottle were evaluated in the same manner as in Comparative Example 4. The results are shown in Table 1.

Comparative Example 1

The procedures of Comparative Example 4 were repeated except that the mold temperature was set to 30° C. and the heat setting was not carried out, to obtain a bottle (mean crystallinity at the bottle body: 25%).

The heat resistance and the non-adsorptivity of the bottle were evaluated in the same manner as in Comparative Example 4. The results are shown in Table 1.

TABLE 1

| | | | | Non-adsorptivity | | | |
| | | | | Adsorption of methanol (ppm) | | Adsorption of p-xylene (ppm) | |
| | Mean crystallinity at bottle body (%) | Heat resistance | Treatment temperature (°C.) | before treatment | after 4-hour treatment | before treatment | after 4-hour treatment |
| --- | --- | --- | --- | --- | --- | --- | --- |
| Comp. Ex. 4 | 33 | good | 50 | 1300 | 600 | 780 | 80 |
| | | | 80 | 1300 | 300 | 780 | 20 |
| Comp. Ex. 5 | 38 | good | 50 | 1050 | 550 | 710 | 75 |
| | | | 80 | 1050 | 250 | 710 | 40 |
| | | | 100 | 1050 | 150 | 710 | 20 |
| Comp. Ex. 6 | 42 | very good | 50 | 800 | 300 | 650 | 60 |
| | | | 80 | 800 | 150 | 650 | 30 |
| | | | 100 | 800 | 100 | 650 | 20 |
| | | | 130 | 800 | 80 | 650 | 5 |

TABLE 1-continued

| | Mean crystallinity at bottle body (%) | Heat resistance | Treatment temperature (°C.) | Non-adsorptivity | | | |
|---|---|---|---|---|---|---|---|
| | | | | Adsorption of methanol (ppm) | | Adsorption of p-xylene (ppm) | |
| | | | | before treatment | after 4-hour treatment | before treatment | after 4-hour treatment |
| Comp. Ex. 1 | 25 | poor | 50 | 2250 | 1050 | 1300 | 950 |
| | | | 80 | 2250 | —*1 | 1300 | — |
| | | | 100 | 2250 | — | 1300 | — |
| | | | 130 | 2250 | — | 1300 | — |

*1: The bottle was distorted and could not be measured.

Comparative Example 7

Polyethylene terephthalate (J135 available from Mitsui PET Resin K. K.) was molded by an injection molding machine M-100A produced by Meiki Seisakusho K.K. to obtain a preform. The molding temperature at this time was 290° C.

Subsequently, the preform was heated by an infrared heater provided as an accessory on the molding machine so that the center of the preform body had a surface temperature of 90° to 100° C., and then subjected to stretching and blowing by the use of a blowing machine LB-01 produced by CORPOPLAST Co. to obtain a bottle (mean crystallinity at the bottle body: 38%).

In the above stretching and blowing, the mold was heated to 150° C., and the bottle was contacted with the mold for 5 seconds to heat set the bottle. Thereafter, the bottle was cooled to 100° C. or lower, and taken out of the mold.

The heat resistance of the thus obtained bottle was evaluated, and the result is shown in Table 2.

Further, the non-adsorptivity of the resultant bottle was evaluated in the same manner as described above, in which the methanol (or paraxylene) adsorbed bottle was subjected to the treatment of immersing for 1 hour in water (distilled water) having a temperature of 50° C. or 80° C. respectively, or in water vapor having a humidity of 90% and a temperature of 100° C. or 130° C. respectively indicated in Table 2.

The adsorptions before and after the treatment are shown in Table 2.

Comparative Example 2

The procedures of Comparative Example 7 were repeated except that the mold temperature was set to 30° C. and the heat setting was not carried out, to obtain a bottle (mean crystallinity at the bottle body: 25%).

The heat resistance and the non-adsoptivity of the bottle were measured in the same manner as in Example 4. The results are shown in Table 2.

TABLE 2

| | Mean crystallinity at bottle body (%) | Heat Resistance | Treatment temperature (°C.) | Non-adsorptivity | | | |
|---|---|---|---|---|---|---|---|
| | | | | Adsorption of methanol (ppm) | | Adsorption of p-xylene (ppm) | |
| | | | | before treatment | after 1-hour treatment | before treatment | after 1-hour treatment |
| Comp. Ex. 7 | 38 | very good | 50 | 1050 | 550 | 710 | 75 |
| | | | 80 | 1050 | 250 | 710 | 40 |
| | | | 100 | 1050 | 150 | 710 | 20 |
| | | | 130 | 1050 | 100 | 710 | 10 |
| Comp. Ex. 2 | 25 | poor | 50 | 2250 | 1050 | 1300 | 950 |
| | | | 80 | 2250 | —*1 | 1300 | — |
| | | | 100 | 2250 | — | 1300 | — |

*1: The bottle was distorted and could not be measured.

EXAMPLE 5

Polyethylene terephthalate containing 10% by mol of isophthalic acid component units as the dicarboxylic acid constituent units (copolymerized polyester (A)) (available from Mitsui PET Resin K. K.) was molded by an injection molding machine M-100A produced by Meiki Seisakusho K. K. to obtain a preform. The molding temperature at this time was 290° C.

Subsequently, the preform was heated by an infrared heater provided as an accessory on the molding machine so that the center of the preform body had a surface temperature of 115° C., and then subjected to stretching and blowing by the use of a blowing machine LB-01 produced by CORPOPLAST Co. to obtain a bottle (mean crystallinity at the bottle body: 35%). The stretch index of the bottle was 185 cm.

In the above stretching and blowing, the mold was heated to 150° C., and the bottle was contacted with the mold for 5 seconds to heat set the bottle. Thereafter, the bottle was cooled with air of 30° C. to have a surface temperature of 100° C. or lower, and taken out of the mold.

The heat resistance of the thus obtained bottle was measured, and the result is shown in Table 3.

Further, the non-adsorptivity of the resultant bottle was evaluated in the same manner as described above, in which the methanol (or paraxylene) adsorbed bottle was subjected to the treatment of holding for 4 hours in an air oven of 80° C. The adsorptions before and after the treatment are shown in Table 3.

EXAMPLE 6

The procedures of Example 5 were repeated except that a polyester resin composition comprising polyethylene terephthalate (J135 available from Mitsui PET Resin K.K.) and another polyethylene terephthalate containing 90% by mol of isophthalic acid component units in the dicarboxylic acid constituent units, 85% by mol of dihydroxyethoxyresorcinol component units in the dihydroxy compound constituent units and 0.3 part by mol of trimethylolpropane based on 100 parts by mol of the dicarboxylic acid constituent units (copolymerized polyester (B)) (available from Mitsui PET Resin K.K.) was used, to obtain a bottle (mean crystallinity at the bottle body: 36%).

The heat resistance and the non-adsorptivity of the bottle were evaluated in the same manner as in Example 5. The results are shown in Table 3.

EXAMPLE 7

The procedures of Example 5 were repeated except that polyethylene naphthalate was used in place of the copolymerized polyester (A), to obtain a bottle (mean crystallinity at the bottle body: 36%).

The heat resistance and the non-adsorptivity of the bottle were evaluated in the same manner as in Example 5. The results are shown in Table 3.

EXAMPLE 8

The procedures of Example 5 were repeated except that polyethylene terephthalate containing 3% by mol of cyclohexanedimethanol component units in the dihydroxy compound constituent units (available from Eastman Kodak Co.) was used, to obtain a bottle (mean crystallinity at the bottle body: 33%).

The heat resistance and the non-adsoptivity of the bottle were evaluated in the same manner as in Example 5. The results are shown in Table 3.

EXAMPLE 9

The procedures of Example 5 were repeated except that the mold temperature was set to 190° C. in the stretching and blowing, to obtain a bottle (mean crystallinity at the bottle body: 42%).

The heat resistance and the non-adsorptivity of the bottle were evaluated in the same manner as in Example 5. The results are shown in Table 3.

EXAMPLE 10

The procedures of Example 5 were repeated except that the mold temperature was set to 230° C. in the stretching and blowing, to obtain a bottle (mean crystallinity at the bottle body: 52%).

The heat resistance and the non-adsorptivity of the bottle were evaluated in the same manner as in Example 5. The results are shown in Table 3.

Comparative Example 3

The procedures of Example 5 were repeated except that polyethylene terephthalate (J135 available from Mitsui PET Resin K. K.) was used, the mold temperature was set to 30° C. and the heat setting was not carried out, to obtain a bottle (mean crystallinity at the bottle body: 25%).

The heat resistance and the non-adsorptivity of the bottle were evaluated in the same manner as in Example 5. The results are shown in Table 3.

TABLE 3

| | Mean crystallinity at bottle body (%) | Heat resistance | Treatment temperature (°C.) | Non-adsorptivity | | | |
|---|---|---|---|---|---|---|---|
| | | | | Adsorption of methanol (ppm) | | Adsorption of xylene (ppm) | |
| | | | | before treatment | after 4-hour treatment | before treatment | after 4-hour treatment |
| Ex. 5 | 35 | good | 80 | 1210 | 706 | 38 | 12 |
| Ex. 6 | 36 | good | 80 | 1008 | 533 | 47 | 13 |
| Ex. 7 | 36 | very good | 80 | 625 | 162 | 8 | 1 |
| Ex. 8 | 33 | good | 80 | 1300 | 750 | 192 | 62 |
| Ex. 9 | 42 | very good | 80 | 900 | 600 | 23 | 8 |
| Ex. 10 | 54 | very good | 80 | 400 | 300 | 15 | 6 |
| Comp. Ex. 3 | 25 | poor | 80 | 2500 | 1320 | 1013 | 609 |

What is claimed is:

1. A refillable polyester stretched bottle having a mean crystallinity of 32 to 70% at the bottle body and capable of desorbing adsorbates from surfaces thereof by contact with water or water vapor heated to 40° to 150° C., wherein the polyester comprises a resin composition comprising polyethylene terephthalate in an amount of 85 to 99% by weight and at least one of the following copolymerized polyesters (A) to (G) in an amount of 15 to 1% by weight:

(A) a copolymerized polyester comprising:
dicarboxylic acid constituent units which comprise terephthalic acid component units and isophthalic acid component units, and
dihydroxy compound constituent units which comprise ethylene glycol component units;

(B) a copolymerized polyester comprising:
   dicarboxylic acid constituent units which comprise isophthalic acid component units and terephthalic acid component units;
   dihydroxy compound constituent units which comprise dihydroxyethoxyresorcinol component units and ethylene glycol component units, and
   polyfunctional hydroxy compound constituent units having at least three hydroxy groups;

(C) a copolymerized polyester comprising:
   dicarboxylic acid constituent units which comprise terephthalic acid component units and 2,6-naphthalenedicarboxylic acid component units, and
   dihydroxy compound constituent units which comprise ethylene glycol component units;

(D) a copolymerized polyester comprising:
   dicarboxylic acid constituent units which comprise terephthalic acid component units and adipic acid component units, and
   dihydroxy compound constituent units which comprise ethylene glycol component units;

(E) a copolymerized polyester comprising:
   dicarboxylic acid constituent units which comprise terephthalic acid component units, and
   dihydroxy compound constituent units which comprise ethylene glycol component units and diethylene glycol component units;

(F) a copolymerized polyester comprising:
   dicarboxylic acid constituent units which comprise terephthalic acid component units, and
   dihydroxy compound constituent units which comprise ethylene glycol component units and neopentyl glycol component units; and (G) a copolymerized polyester comprising:
   dicarboxylic acid constituent units which comprise terephthalic acid component units, and
   dihydroxy compound constituent units which comprise ethylene glycol component units and cyclohexanedimethanol component units.

2. The polyester bottle according to claim 1, wherein the stretch index of the bottle, as defined by the following formula (I), is 130 cm or more:

$$\frac{\text{Stretch}}{\text{Index}} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \; (cm^{-1})$$

3. The polyester bottle according to claim 1, wherein the methanol adsorption of the body of the bottle is 1,500 ppm or less at 25° C. and the para-xylene adsorption of the body of the bottle is 300 ppm or less at 25° C.

4. The polyester bottle according to claim 1, wherein the mean crystallinity at the bottle body is 35 to 65%.

* * * * *